United States Patent Office 3,485,548
Patented Dec. 23, 1969

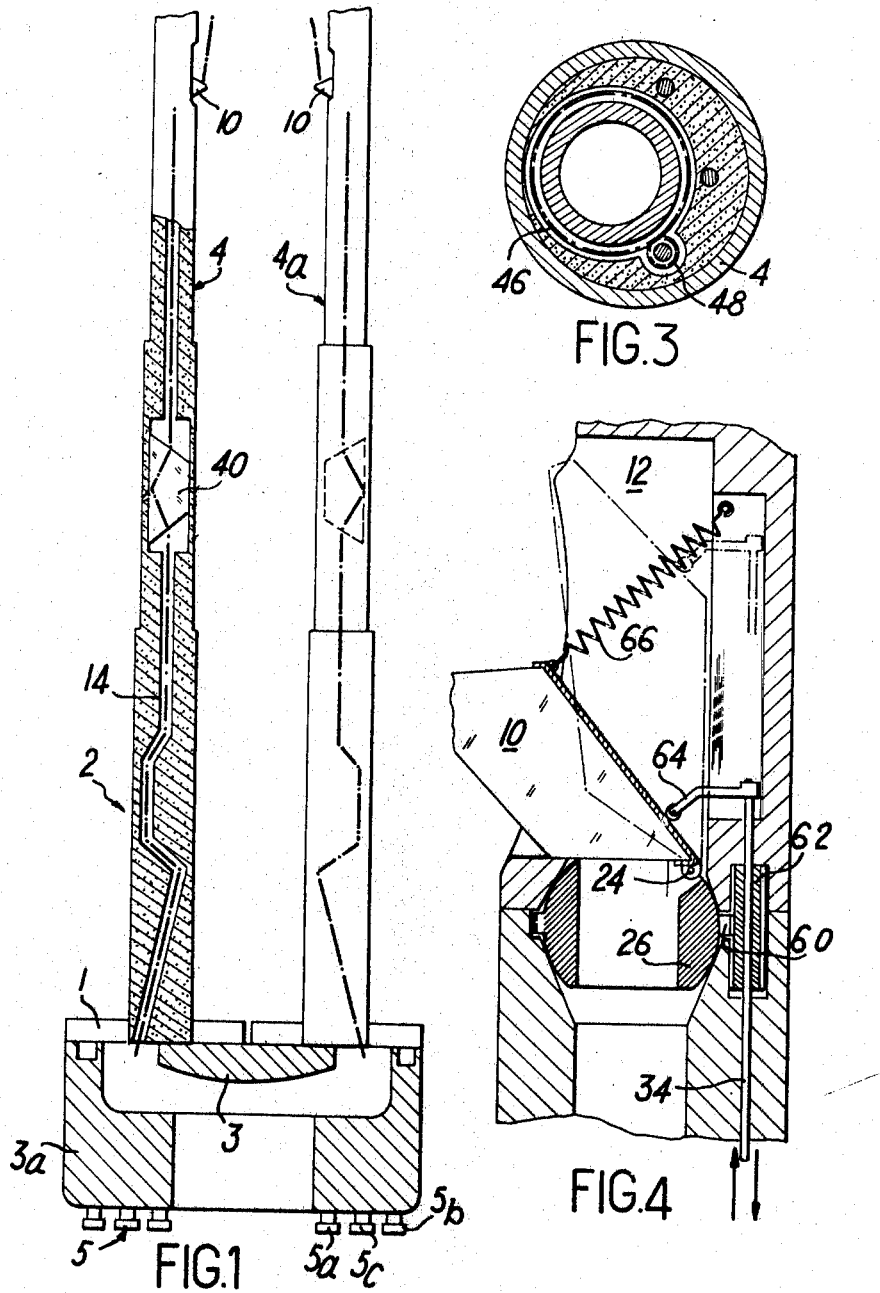

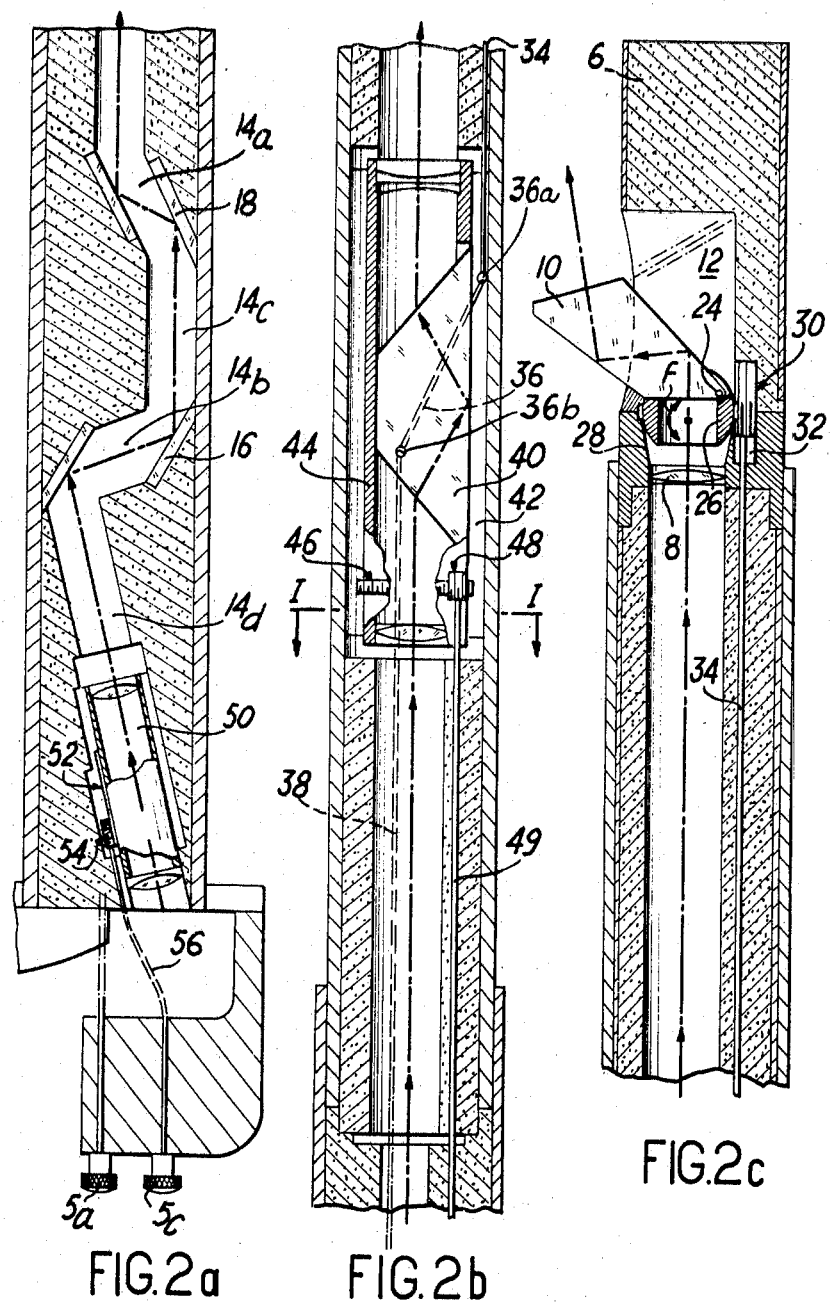

3,485,548
STEREOSCOPIC TELESCOPE FOR THE REMOTE VIEWING OF OBJECTS PLACED IN A SEALED EXAMINATION CAVE
Charles Brebant, Aix-en-Provence, and Jacques Labet and Pierre Mosse, Marsielle, France, assignors to Commissariat a l'Energie Atomique, Paris, France
Filed Sept. 7, 1966, Ser. No. 577,636
Claims priority, application France, Sept. 13, 1965, 31,269
Int. Cl. G02b 23/02
U.S. Cl. 350—36
7 Claims

ABSTRACT OF THE DISCLOSURE

A stereoscopic telescope for viewing objects in a sealed enclosure has two identical optical systems. A tube through the enclosure wall surrounds the systems and includes radiation absorbing material forming a staggered path for the light beams. Each system has a movable prism within the enclosure in a recess in radiation absorbing material. The prisms are adjustable for regulating the convergence with the other prism. A binocular head has control elements for focusing the telescope and for adjustment of the prisms.

---

The remote viewing of objects contained in a sealed enclosure or examination cave which provides protection against radioactive contamination entails the use of an apparatus in which the image can be transmitted through a wall of substantial thickness in view of the fact that the head which carries the object-lens must be located inside the cave whilst the eye-piece lens is located outside the cave.

The means which are at present employed for this purpose consist of periscopes, the optical systems of which are protected by screens formed of shielding material. However, the image which is thus obtained is flat and does not give a sufficiently accurate indication of the relief of the object or specimen under examination.

The aim of this invention is to permit easy focusing on the object to be viewed, irrespective of its location within the cave, and also to provide stereoscopic vision of said object.

The invention is accordingly directed to a stereoscopic telescope comprising at least one tube which provides a passageway through the cave wall and surrounds optical systems, a radiation-absorbing material disposed in such a manner as to form a staggered path for the light beam and mirrors for deflecting the rays along oblique paths relative to the axis of said tube, and characterized in that it comprises two identical optical systems which are symmetrical with respect to the axis of the through-passage and each comprising a prism for receiving the image, each of said prisms being capable of moving within a recess formed in the radiation-absorbing material for the purpose of regulating the convergence of said prism with the prism of the other optical system, and a system for erecting the image supplied by said prisms, and a binocular head carrying the control devices for adjusting the focus of the telescope.

In a preferred embodiment, each optical system is placed within a through-tube and surrounded inside said tube by shielding material.

The image-receiving prism is mounted within a recess formed in the through-tube, said recess being provided with a lateral opening and shielded by a block of radiation-absorbing material with which the end of said through-tube is packed. Said prism is pivotally mounted on a knuckle bearing which is pierced by a diametral bore providing a passageway for the light beam and the position of said prism is controlled from the viewing station.

Similarly, both the erection and magnification of the images are regulated from the viewing station.

It is thus possible to focus the telescope without any difficulty on any object which is located within the cave and to obtain both a clear and accurate stereoscopic vision of said object without entertaining the fear that the path of the light beam is in any way liable to permit the passage of harmful radiation.

A number of other properties and advantages of the invention will in any case become apparent from the following description of one embodiment which is given solely by way of non-limitative example, reference being made to the accompanying drawings, in which:

FIG. 1 is a general view, partly looking on the exterior and partly in diagrammatic cross-section, of a stereoscopic telescope without its binocular head.

FIGS. 2a, 2b, 2c illustrate an axial cross-section on a large scale the three main sections of the telescope of FIG. 1;

FIG. 3 is a view in cross-section taken along the line I—I of FIG. 2b;

FIG. 4 shows an alternative form of construction of the control system employed for actuating the entrance prism.

The stereoscopic telescope which is illustrated in FIG. 1 comprises a binocular head, of which only the support 1 is shown in the drawings, and which is intended to remain outside a hot cell or sealed cave which provides total containment of nuclear radiation. The objects or specimens to be examined are located within said cave and an image transmission unit 2 traverses the wall of said cave. The support 1 comprises a block 3 and 3a which is formed of radiation-absorbing material such as lead and which is mounted between the cave wall and the head so as to shield this latter against radiations. Said support carries members 5 whereby the focusing of the telescope and the adjustment of the different components of the apparatus may be carried out from the exterior.

In the embodiment which is illustrated in the drawings, the image transmission unit is constituted by two parallel tubes 4 and 4a having a length which is sufficient to pass through the entire thickness of the shield wall, an optical system contained in each tube and, between the elements of said image transmission unit, a material for absorbing radioactive radiations which leaves a passageway only for the light beam and the control elements.

Within the interior of the cave, the tube 4 is closed off by a block 6 of shielding material (as shown in FIG. 2c) and the object-lens 8 receives the image through a prism 10 which is adjustably mounted in a recess 12.

Said prism 10 is pivotally mounted at 24 on a knuckle bearing 26 which is pierced by a diametral bore providing a passageway for the light beam and which is maintained applied against a frusto-conical bearing surface 28 formed at the end of the recess 12. Said knuckle bearing is in contact with a cylindrical cam 30 movable within a recess 32 which is in parallel relation with the recess 12. A rod 34 which is rigidly fixed to the cam 30 is connected through a universal joint 36a to an articulated arm 36 which is connected through a universal joint 36b to a second rod 38 which is parallel therewith and is operated both in translational and rotational motion by means of a control knob 5a which is fixed on the block 3a.

The translational motion of the rods 34 and 38 and of the cam 30 initiates by frictional contact the movement of rotation of the knuckle 26 in the direction of the arrow f, thereby producing the pivotal movement of the prism 10. Similarly, a movement of rotation imparted to the rod 38 results in the rotation both of the rod 34 and of the cam 30, which in turn causes the knuckle 26 to rotate about an axis which is parallel to that of the tube 4. The prism 10 is then caused to perform a lateral movement of angular displacement within the opening of the recess 12.

These two movements modify the position of the optical axis of the prism and make it possible to bring the prism of each tube in convergence with the prism of the other tube and to adjust them relatively to the object to be viewed in such a manner as to obtain good stereoscopic fusion of the two images which are received.

If necessary, said images are erected by means of a Wollaston prism 40 (as shown in FIG. 2b) which is placed inside a central recess 42 of the shielding material. Said prism 40 is mounted in a cylinder 44 which is provided with a toothed collar 46, said collar being in mesh with a pinion 48 which is driven in rotation by means of a rod 49 and this latter being rigidly fixed to the control knob 5b of the block 3a. It is therefore possible, simply by rotating the knob 5b, to change the inclination of the light beam through each corresponding prism and consequently to erect the images which are transmitted by each tube. These two images can therefore be not only erect but strictly in register, and relative inclination of one field with respect to the other being eliminated.

A focusing carriage 50 operated by a third control knob 5c which is provided on the block 3a is mounted within the tube 4 in proximity to the eyepiece. The carriage is rigidly fixed to a rack 52 which is engaged with a wormscrew 54, said wormscrew being connected by a cable 56 to said control knob 5c. Sharp stereoscopic vision can thus be obtained even if the object to be examined within the cave is located at an appreciable distance from the object-lens. The stereoscopic telescope herein described accordingly permits the possibility of viewing any object irrespective of its location. In point of fact, the two-directional pivotal motion of the two prisms makes it possible to focus these latter on said object and to sweep over a wide area, and focusing is readily effected according to the distance at which said object is located.

Convenience of observation is further enhanced by the use of a stereoscopic binocular magnifying glass, thereby entailing an exit pupil of large size for the stereoscopic periscope.

As it passes through the wall, namely through the tubes 4, the light beam reaches the different optical systems through a channel 14 which is formed in the shielding material. Said channel is provided in proximity to the block 3a with a staggered portion constituted by two oblique passages 14a and 14b which are connected to each other by means of a longitudinal passage 14c and connected to the eyepiece (not shown in the drawings) by means of a third oblique passage 14d. Two sets of parallel mirrors 16 and 18 which are placed at the points of change of direction of the channel 14 deviate the light beam through a corresponding angle.

The device has been so designed that no radioactive radiation is capable of passing through the cell walls.

The length and diameter of the tubes 4 are determined by the thickness of the wall to be traversed and the dimensions of the openings formed in said walls. Said two tubes could also be combined into a single tubular unit, the optical systems being separated by a screen of shielding material.

In the case of a telescope comprising two tubes 4, each tube is fitted with a control mechanism (which has not been shown in the drawings) for rotating the prism about its pivotal mounting 24 so that it may be fully withdrawn inside the recess 12 at the time of positioning of the tubes 4 within the shield wall.

The rotation control mechanism can also be coupled to the other prism-actuating mechanisms. FIG. 4 shows a design of this type in the case of the mechanism employed for operating the prism 10, in which the knuckle bearing 26 is provided with an externally-toothed annulus 60 which is engaged with a cylindrical pinion 62, said pinion being rigidly fixed to the rod 34 which initiates the movement of rotation of the toothed annulus 60 and of the knuckle bearing 26 about the axis of the tube 4 when the rods 38, 34 rotate under the action of the control knob 5a.

At the extremity of the rod 34 which is located beyond the pinion 62, there is fitted a push-rod 64 which is applied against the prism 10 and thrusts this latter outside the recess 12 in opposition to the action exerted by a spring 66 which is mounted between said prism 10 and the bottom of the recess 12 and which has a tendency to return said prism inside said recess 12.

The translational motion of the rod 34 causes the push-rod 64 to slide over the surface of the prism, thereby initiating the pivotal motion of the prism about the axis 24 at right angles to the axis of the tube 4 and modifies its angle of slope with respect to said tube. Said pivotal motion in conjunction with the movement of rotation which is produced by the pinion 62 and the toothed annulus 60 permits focusing on the object to be examined, but the pivotal motion referred-to can in addition be complete and thus bring back the prism 10 into an inoperative position in which it is entirely contained within the recess 12.

In such a case, the tube 4 no longer has any projecting part and can thus be readily inserted in the opening of the cave wall.

A number of different modifications could in any case be made in the embodiment which has just been described by way of example without thereby departing either from the scope or the spirit of the invention.

What we claim is:

1. A steroscopic telescope for remote viewing of objects placed in a sealed cave containing radio active elements comprising two parallel tubes each providing cooperating passageways through the cave wall, two identical optical systems one in each of said tubes, radiation absorbing material inside each of said tubes surrounding the optical system therein, a staggered path for the light beam formed in said material, reflecting means in each tube for reflecting the rays along the staggered path relative to the axis of each tube, optically aligned focusing means in the staggered path, a first prism in each of said optical systems located in a recess in said radiation absorbing material receiving the image of the object, individual pivotal means for moving each of said prisms within said recess for regulating the light ray convergence from said prisms, said recesses having facing lateral openings and each shielded by a block of radiation absorbing material closing the inner end of said tube, a second prism in each staggered path for erecting the image and optically aligned with the others of said prisms and mirrors, a binocular system optically interconnecting said optical systems at the end of said tubes remote from the cave and control means connected with each of said prisms, said focusing means and said binocular system for manipulation thereof remote from the cave.

2. A telescope in accordance with claim 1, wherein said first prism is pivotally mounted on a knuckle bearing having a pierced diametral bore providing a passageway for the light beam and mounted in the tube recess.

3. A telescope in accordance with claim 2, wherein said control means rotates each knuckle bearing about the axis of the tube at right angles thereto.

4. A telescope in accordance with claim 2, wherein said control means produces a pivotal motion of the first prism about its axis of articulation on the knuckle bearing between a position in which said prism is withdrawn inside said recess for positioning the apparatus and an outwardly -extended operative position.

5. A telescope in accordance with claim 1, wherein said first prism control means comprises a rod for each of said first prisms extending lengthwise of said tubes and operably associated with said knuckle bearing movable both in a translational and rotational motion and to which is rigidly fixed a second rod adjacent said first prism for controlling the pivotal motion of the prism.

6. A telescope in accordance with claim 1, wherein each image erecting prism being rigidly fixed to a toothed annulus engaged with a pinion driven in rotation by said control means.

7. A telescope in accordance with claim 1, each optical system comprising a carriage for adjusting the focus and rigidly fixed to a rack which is engaged with a worm-screw.

References Cited

UNITED STATES PATENTS

| | | | |
|---|---|---|---|
| 1,530,081 | 3/1925 | Humbrecht et al. | 350—26 |
| 2,028,430 | 1/1936 | Baddorf et al. | 350—26 X |
| 2,505,819 | 5/1950 | Wrigley et al. | 350—26 X |
| 3,041,916 | 7/1962 | Clave et al. | 350—55 X |
| 3,202,048 | 8/1965 | Ballmer et al. | 350—25 |
| 3,229,577 | 1/1966 | Ellinger | 350—26 |

FOREIGN PATENTS 726,036   3/1955   Great Britain.

DAVID SCHONBERG, Primary Examiner

PAUL R. GILLIAM, Assistant Examiner

U.S. CL. X.R.

350—26, 44, 52, 54